(12) United States Patent
Kwok

(10) Patent No.: US 7,729,427 B2
(45) Date of Patent: Jun. 1, 2010

(54) PSEUDO-SYNCHRONOUS ONE WIRE BIDIRECTIONAL BUS INTERFACE

(75) Inventor: Chung Y. Kwok, Irvine, CA (US)

(73) Assignee: Intersil Americas Inc., Milpitas, CA (US)

( * ) Notice: Subject to any disclaimer, the term of this patent is extended or adjusted under 35 U.S.C. 154(b) by 1025 days.

(21) Appl. No.: 10/875,763

(22) Filed: Jun. 24, 2004

(65) Prior Publication Data

US 2005/0185720 A1    Aug. 25, 2005

Related U.S. Application Data

(60) Provisional application No. 60/547,267, filed on Feb. 24, 2004, provisional application No. 60/548,934, filed on Mar. 1, 2004, provisional application No. 60/549,175, filed on Mar. 2, 2004.

(51) Int. Cl.
*H04B 3/00* (2006.01)
(52) U.S. Cl. .................. 375/257; 375/316; 375/242; 375/239; 375/238; 375/253; 375/222; 375/288; 326/30; 333/17.3; 333/32; 379/398
(58) Field of Classification Search .............. 375/257; 326/30; 333/17.3, 32; 379/398
See application file for complete search history.

(56) References Cited

U.S. PATENT DOCUMENTS

| | | | | |
|---|---|---|---|---|
| 4,288,874 A | * | 9/1981 | Yamada | 375/371 |
| 4,388,725 A | * | 6/1983 | Saito et al. | 375/257 |
| 4,502,024 A | * | 2/1985 | Nishikawa et al. | 332/109 |
| 4,611,335 A | * | 9/1986 | Arai et al. | 375/360 |
| 4,655,335 A | * | 4/1987 | Maruyamano et al. | 192/99 S |
| 4,746,898 A | * | 5/1988 | Loeppert | 341/70 |
| 4,841,167 A | * | 6/1989 | Saegusa | 327/98 |
| 4,864,303 A | * | 9/1989 | Ofek | 341/95 |
| 4,943,926 A | * | 7/1990 | Guzman-Edery et al. | 702/79 |
| 5,414,830 A | * | 5/1995 | Marbot | 710/71 |
| 5,638,448 A | | 6/1997 | Nguyen | |
| 5,724,368 A | | 3/1998 | Zook | |
| 5,727,447 A | * | 3/1998 | Shiraishi et al. | 92/164 |

(Continued)

FOREIGN PATENT DOCUMENTS

DE    10216396    10/2003

OTHER PUBLICATIONS

Menezes et al.; "Handbook of Applied Cryptography, Challenge-Response Identification (Strong Authentication)" 1997, Handbook of Applied Cryptography, CRC Press Series on Discrete Mathematics and its Applications, Boca Raton, Fl, CRC Press, US, pp. 397-404,490, XP002282273.

*Primary Examiner*—Chieh M Fan
*Assistant Examiner*—Siu M Lee
(74) *Attorney, Agent, or Firm*—Howison & Arnott, L.L.P.

(57) ABSTRACT

A system and method for transferring data between a transmitter and a receiver over a single conductor is disclosed. During a data transfer operation of bit of information, the voltage level on the conductor is changed from a first voltage level to a second voltage level and maintained at the second voltage level for a predetermined duration of time. The predetermined duration of time is determined by the logical state of the data bit being transmitted. Upon expiration of the predetermined duration of time the voltage level on the conductor is driven back to substantially the first voltage level.

31 Claims, 11 Drawing Sheets

U.S. PATENT DOCUMENTS

| | | | |
|---|---|---|---|
| 5,905,406 A * | 5/1999 | Sugden et al. | 329/312 |
| 6,321,354 B1 | 11/2001 | Prunier | |
| 6,359,481 B1 * | 3/2002 | Kim | 327/141 |
| 6,530,029 B1 * | 3/2003 | Metchev | 713/500 |
| 6,567,476 B2 * | 5/2003 | Kohl et al. | 375/293 |
| 6,741,668 B1 * | 5/2004 | Nakamura | 375/376 |
| 6,777,975 B1 * | 8/2004 | Dabral et al. | 326/30 |
| 6,904,558 B2 | 6/2005 | Cavanna et al. | |
| 6,990,042 B2 * | 1/2006 | Stark | 365/233 |
| 7,053,667 B1 * | 5/2006 | Tang | 327/31 |
| 7,079,038 B2 | 7/2006 | Wendelrup et al. | |
| 7,079,589 B1 * | 7/2006 | Maksimovic et al. | 375/295 |
| 7,280,629 B2 * | 10/2007 | Dunning et al. | 375/373 |
| 7,290,196 B1 | 10/2007 | Annayya et al. | |
| 2003/0061519 A1 | 3/2003 | Shibata et al. | |
| 2003/0137856 A1 * | 7/2003 | Sheng et al. | 363/72 |
| 2004/0022546 A1 * | 2/2004 | Cochran et al. | 398/183 |
| 2004/0101060 A1 * | 5/2004 | Simon et al. | 375/242 |
| 2004/0264230 A1 * | 12/2004 | Brand et al. | 365/145 |
| 2005/0001589 A1 | 1/2005 | Edington et al. | |
| 2006/0221175 A1 * | 10/2006 | Shen et al. | 348/14.04 |

* cited by examiner

US 7,729,427 B2

PSEUDO-SYNCHRONOUS ONE WIRE BIDIRECTIONAL BUS INTERFACE

RELATED APPLICATIONS

This application claims priority from U.S. Provisional Application No. 60/547,267, filed on Feb. 24, 2004, U.S. Provisional Application No. 60/548,934, filed on Mar. 1, 2004 and U.S. Provisional Application 60/549,175, filed on Mar. 2, 2004 which are incorporated herein by reference.

TECHNICAL FIELD OF THE INVENTION

The present invention relates to single wire communication between a master device and a slave device, and more particularly, to single wire communication utilizing pulse widths to represent transmitted data between a host device and a slave device.

BACKGROUND OF THE INVENTION

At times it may be necessary to interconnect first and second devices via a single wire connection. When devices are connected in this fashion, one device is designated as the host device for controlling the communications between the two devices while the other device is designated as the slave device so as to control traffic on the single wire bus. Host and slave devices interconnected by a single wire require the use of a single wire interface protocol to enable the transmission of data over the single wire between the two devices. Previous systems have used a number of different techniques to transmit information over a single wire. One such system controls transmissions between a host device and a slave device by initially transmitting control information from the host device to the slave device. After transmission of the control information, the host device next drives the signal on the single wire low to indicate the beginning of a transmission period. After a predetermined delay from the start of the transmission period, the data to be transmitted between the host device and the slave device is indicated on the single wire by driving the voltage level on the line high if a logical "1" is being transmitted or maintaining the signal at a low level if a logical "0" is being transmitted. Thus, the time period required to transmit either a logical "1" bit or a logical "0" bit is the same no matter which logical bit is being transmitted since the logical data always resides within a predetermined delay from the initiation of the transmission period. Some manner for more quickly and efficiently transmitting logical data between a host device and a slave device over a single wire connection is desired.

SUMMARY OF THE INVENTION

The present invention disclosed and claimed herein, in one aspect thereof, comprises a system and method for transmitting data between a transmitter and a receiver over a single conductor. The voltage level of the conductor is maintained at a first voltage level when data is not being transmitted between the transmitter and the receiver. When a data transfer operation must be performed to transmit a bit of information, the voltage level on the conductor is driven from the first voltage level to a second voltage level. The voltage level on the conductor is maintained at the second voltage level for a predetermined duration of time. The predetermined duration of time has a length that is determined by the logical state of the data bit to be transmitted. Upon completion of the predetermined duration of time, the voltage level on the conductor returns to the first voltage level.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
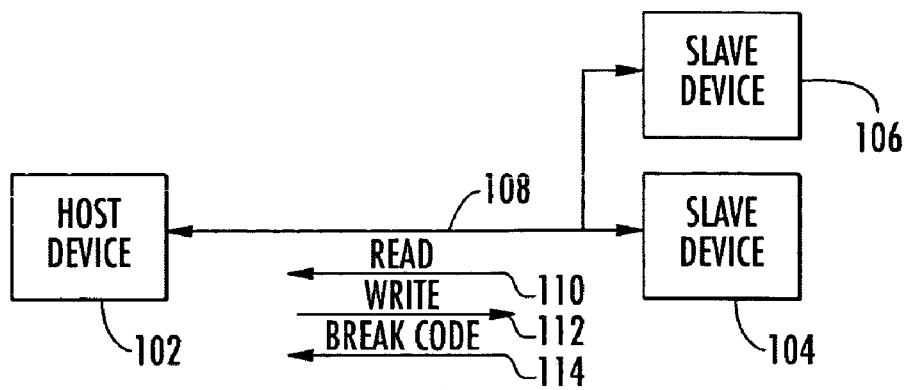
FIG. 1 is a block diagram illustrating a single wire connection between a host device and a pair of slave devices.

As will be described more fully hereinbelow, the data is transmitted from the host device 102 to the slave device 104, 106 in blocks of data, each data block comprised of eight bits of data or a single byte of data. This is a conventional technique for transferring data. However, data could be transmitted one bit at a time. This one bit data transmission might present a problem, as each Write operation requires configuration information to be sent to the slave device indicating what operation is to follow, with the preferred embodiment being to transfer blocks of data comprised of one or more bytes. Whenever data is to be transmitted from the host 102 to the slave 104, 106, it is necessary to precede such an operation with the transfer of access instructions. The slave is always in a default receive mode such that it will receive access instructions. All instructions must typically be on a word boundary such that the data word will be four bits long, eight bits long or sixteen bits long (and they could be much longer). Therefore, the instruction word will be received as a defined number of bits. In a default mode, the slave 104, 106 must be aware of the number of bits that comprise the instruction. Thus, when the group of bits representing the instruction are received by the slave 104, 106, the slave 104, 106 then configures itself for the appropriate mode of operation, i.e., to receive data or transmit data. Again, this data will be transmitted in single serially transmitted bits which would typically have some type of word boundary such that the data will be transmitted in a block of bits representing a byte, or longer block. This is such that the receiving device is aware of when the transmission has been completed without requiring additional overhead bits indicating the start of a transmission or the stop of a transmission.

The operation of the system from a general standpoint is such that there are provided two or more nodes that can be attached to the transmission line 108. Only one of these nodes, be it the host device 102 or either of the slave devices 104 or 106, can transmit data at any one given time. The host device 102 is basically the master node that controls all operations to ensure that there is no "bus contingent." However, once the host device 102 configures the operation for which device is transmitting information, then that operation is handed over to the transmitting one of the devices. This could be the host device 102 or either of the slave devices 104 or 106. All of the other devices are in a receive mode. Although the disclosed embodiment discusses a Read operation as causing one of the slave devices 104 or 106 to enter the transmit mode and transmit data to the bus 108 for specific receipt by the host device 102, it is possible that transfer of data could be between slave devices 104 and 106.

The configuration is such that a transmit circuit on the transmitting one of the devices will have total access to the data line 108 for the purpose of transmitting data thereto with the receiving one of the devices then configured to receive the data in the appropriate manner as set by the original configuration information sent by the host device 102. As will be described in more detail hereinbelow, the transmitting one of the devices provides the data clock information which allows data to be clocked into the receiving one of the devices. The timing reference for the data clock is disposed locally at the transmitting one of the devices wherein the timing reference at the receiving one of the devices is not synchronized to the timing reference at the transmitting one of the devices.

Typically, in any type of serial data transmission, there will be some type of start indicator, followed by the data or content, followed by termination information. In some more complex systems, this could involve the transmission of start bits, then data bits followed by termination or stop bits. In the present disclosure set forth herein, the data is sent on a bitwise basis, such that each bit is comprised of start information, data information and stop information. This is facilitated through the use of some type of sync command that indicates to the receiving device that data is going to be transmitted, followed by transmission of a single bit data wherein a decision can be made by the receiving device as to the logic state thereof, this followed by stop information. Once a bit has been transmitted, the receiving device will await the next bit to be transmitted in the block, which will again require the start information, data information and stop information. After the reception of the block of data by the receiving device, the receiving device will then fall back into the default mode of operation if it is a slave 104, 106 or in to the control mode if it is the host device 102.

As will further be fully disclosed herein, the start information for data transmission will be pulling of the line low, the content will be determined by the length of time the line is held low and the stop information will be the pulling of the line high.

Referring now to the drawings, and more particularly to FIG. 1, a connection between a host device 102 and first and second slave devices 104 and 106 is illustrated. The host device 102 and the pair of slave devices 104 and 106 are connected via a single wire interface 108. Over the single wire interface 108 the host device 102 and slave devices 104, 106 may engage in Read operations 110 wherein data is Read by the host device 102 from one of the slave devices 104, 106, Write operations 112 wherein the host device writes data to one of the slave devices 104, 106, and transmission of a break code 114 indicating a problem with a previous Write operation from one of the slave devices 104, 106 to the host device 102 over the single wire connection 108. It is noted that only one device can transmit information at any given time.

Figure 2:
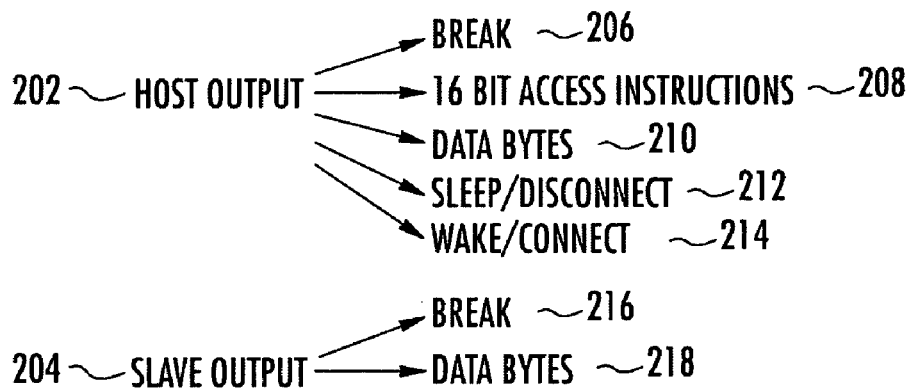
FIG. 2 illustrates the various -bus commands able to be generated using the single wire bus interface of the present invention.

The communication protocol for transmitting the single bit of data over the single wire bus 108 is divided into a number of commands which may be transmitted from the slave device 104, 106 or the host device 102. These are more fully illustrated in FIG. 2 wherein the commands are divided into host output commands 202 and slave output commands 204. A break command 206 transmitted from the host output will reset device bit counters, timers and chip selection within a slave device 104, 106. The break command 206 will also be used to void a current packet transfer from the host device 102 to one of the slave devices 104, 106. The break command 206 can be transmitted at any time and may be sent alone or in the middle of a packet transfer. A 16-bit access instruction command 208 consists of a 1-bit chip select code enabling the addressing of two separate devices, a 2-bit command code, a 2-bit register bank code, an 8-bit address location, and a 3-bit byte field. The 16-bit access instruction will be more fully discussed hereinbelow with respect to FIG. 6.

Data bytes 210 comprises an 8-bit block of data in the disclosed embodiment transmitted from the host output to the slave. Data bytes 210 are transmitted if the command code of the access instruction command 228 indicates the performance of a Write operation, i.e., transfer of data from the host to the slave. The number of blocks transmitted from the host output 202 depends upon the number indicated within the byte field in the 16-bit access instruction command 208. A sleep/disconnect command 212 is used to place the slave device into a sleep mode and the wait/connect command is used to awaken the slave device 104, 106 from the sleep mode.

The slave output commands 204, during a Read Operation for transfer of data from the slave to the host include a break command 216 that is used to indicate to the host that a last instruction received from the host was not executed for some reason. Additionally, when an error occurs in Reading a last instruction, or when a EEPROM Write in progress operation forbids access to the EEPROM, the break command 216 would be transmitted from the slave output. The break command 216 may also be used to flag an alarm/interrupt event occurring at the slave device. If a host instruction following a flagged alarm/interrupt event does not attempt to read the status/interrupt register, an additional break command 216 may be issued by the slave output. Data bytes 218 transmitted from the slave consist of 8-bit blocks of data. The data bytes 208 are transmitted if the command code of the access instruction command 208 indicates a Read operation. The number of blocks transmitted by the slave output 204 depends upon the bytes field within the access instruction command 208.

For the Write operation 112, i.e., transfer of data from the host to the slave, the host device 112 performs the Write operation 112 and no data is transmitted back from the slave devices 104, 106. For a Read operation 110, i.e., transfer of data from the slave to the host, the slave device 104, 106 sends 1-4 data byte packets to the host device 102 depending upon the preceding instruction(s) transmitted, from the host device 102. For the break code operation 114, the slave devices 104,106 transmit a break code if they are unable to perform the instruction given by the host device 102 due to a bus error or a EEPROM access occurring during the EEPROM Write process.

Figure 3:
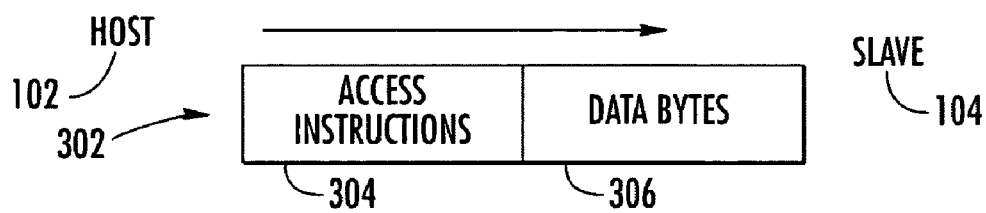
FIG. 3 illustrates the structure of a Write operation from a host device.
Figure 4:
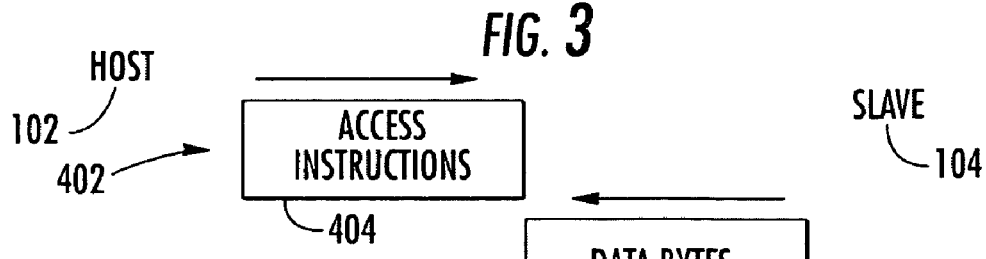
FIG. 4 illustrates the structure of a Read operation at a host device.

Referring now to FIGS. 3 and 4, there are illustrated the structure of the commands transmitted between the host device 102 and slave devices 104, 106 during a Write operation 302 and a Read operation 402, respectively. In FIG. 3, for the Write operation 302, the access instruction 304 is initially transmitted to the slave devices 104, 106 from the host device 102. The data bytes 306 to be written from the host device 102 to the designated one of the slave devices 104, 106 are also transmitted in the same direction. For the Read operation 402 (FIG. 4) between the host device 102 and the slave device 104, for example, the access instructions 404 are initially transmitted from the host device 102 to the slave device 104 to initiate the Read operation. The host device 102 then goes into the receive mode and releases control of the serial bus 108. The slave device 104 then seizes control of the serial bus 108 by entering the transmit mode and the data bytes 406 to be received by the host device 102 are transmitted from the slave device 104 back toward the host device 102.

Figure 5:
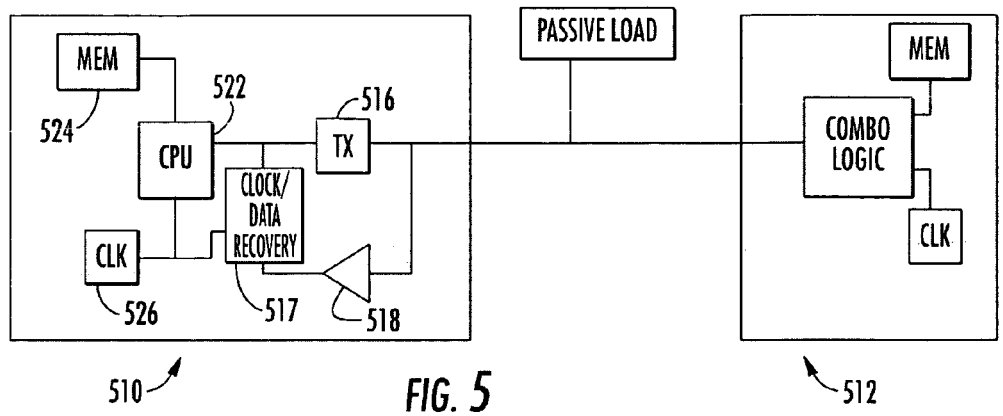
FIG. 5 is a block diagram illustrating a connection between a host device and a slave device using a single wire connection over which data may be transmitted according to the present invention.

Referring now to FIG. 5, there is illustrated the interconnection of a host device 510 and a slave device 512 via a single wire 514. The host device 510 and slave device 512 include circuitry enabling single wire communication over line 514. Line 514 is held weakly high by a passive load device 515 located between the source voltage and line 514. In the Write mode, transmitter 516 at the host device 510 drives line 114 low to facilitate transmission of logical data from the host device 510, this transmitter 516 being an open drain drive transistor. A receiver 518 detects voltage levels transmitted over line 514. The receiver 518 in the host device 510 works in conjunction with the clock/data recovery circuit 515 to detect the occurrence of rising and falling edges of pulses transmitted over line 514 between host device 510 and slave device 512. As will be more fully described hereinbelow, by detecting the occurrence of rising and falling edges of the pulses transmitted over line 514, logical data transmitted between the host device 510 and slave device 512 may be determined. The clock/data recovery circuit 515 enables determination of the received serial data and recovery of the clock signal associated with a transmitted data clock, which transmitted data clock is contained within the transmitted data. The clock/data recovery circuit 517 determines the pulse widths associated with the selected logic states transmitted from the host device 510 to the slave device 512. The clock/data recovery circuit 517 further assists in determining the logic states associated with the determined pulse lengths received from a transmitting device.

The host device 510 further includes a central processing unit 522 for providing all processing functionalities of the host device 510. The CPU 122 controls the manner and timing in which transmitter 516 will actively pull down the voltage levels on line 514 and upon which the transmitter 516 releases line 514 enabling the voltage levels to return to the high level as dictated by the passive load 515. Memory 524, associated with the CPU 522, stores logical data that is transmitted to the slave device 512 and received from the slave device 512.

A clock circuit 526 enables the generation of pulse widths transmitted from the host device 510 to the slave device 512 in a manner which will be more fully described hereinbelow, and which will allow determination of the pulse widths of received signals. A clock circuit 527 located within the slave device 512 operates pseudo-synchronously with respect to the clock 526 located in the host 510. The data that is received by the slave device 512, however, is synchronized to a data clock within the host 510. In order to clock this data into a memory 525, the slave device 512 includes a clock recovery system for recovering the data clock from the received data stream. Similarly, when receiving data from the slave 512, the host 510 has a similar clock recovery system. The circuitry for performing this operation will be more fully described with respect to FIG. 5a.

The slave device 512 includes combinational logic in a block 529 for performing the functions described for transmitting and receiving data. The combinational logic performs the functions of the clock/data recovery circuit 515 and the transmitter 516 described herein above with respect to the host device 510.

When designing an integrated circuit with conventional techniques, the design is carried out with various design tools. These design tools allow the circuit designer to functionally describe a circuit block in terms of the functions performed on received data such that data and timing information can be output from the circuit block with the desired results. However, the designer no longer specifically designs logic circuitry to perform a specific function and then combines these various logic circuits to provide an overall combinatorial logic circuit; rather, the designer inserts the functionality into the program and the program then generates the circuit necessary to facilitate such operation. However, for the purpose of illustration, some representative circuitry will be set forth, it being realized that the entire functionality of the integrated circuit may result in significantly different circuitry and additional circuitry not disclosed. The circuitry required for reading and writing to memory will not be described, as this is conventional circuitry.

Figure 5A:
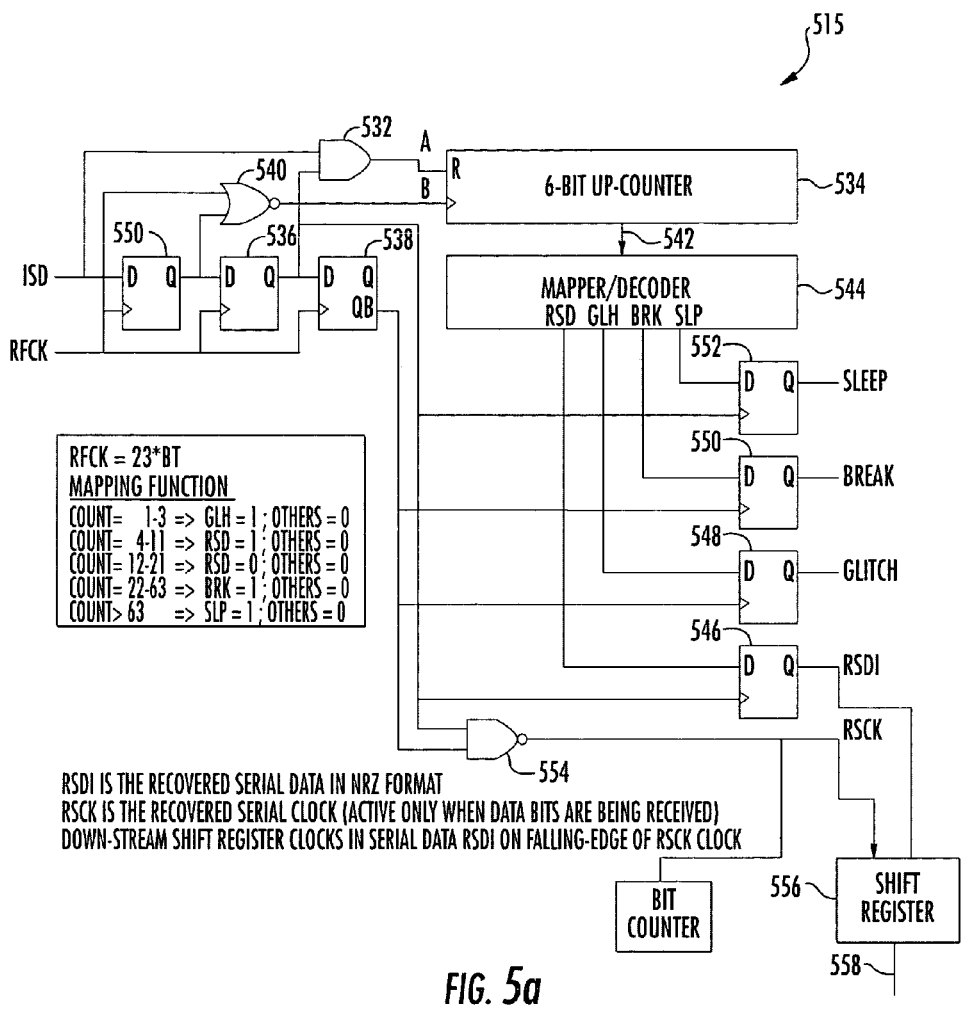
FIG. 5a is a block diagram of the clock/data recovery circuit.

Referring now to FIG. 5a, there is illustrated a logical block diagram of the clock/data recovery circuit 515 in the host device 510, recognizing that such is present in the slave device 512 also. The received serial data (ISD) and a high speed reference clock (RFCK) from the clock 526 are provided to the clock/data recovery circuit 515 from the central processing unit 522. 522. The RFCK signal will equal 23*the bit time, which will be more fully discussed in a moment, such that there will be 23 clock cycles of RFCK for each bit of data. The data signal received over the single wire connection is input to the D-input of a D flip-flop 550. The data signal is also input to one input of an AND gate 532. The second input of AND gate 532 is connected to an output of D flip-flop 536. The output (A) of the AND gate 532 is provided to the input of a 6-bit up-counter 534. Also provided to the clock input of the D flip-flop 550 is the reference clock (RFCK). The RFCK signal is also provided to the clock inputs of D flip-flops 536 and 538. Flip-flop 536 has its D-input connected to the Q-output of flip-flop 550 and the D-input of flip-flop 538 is connected to the Q-output of flip-flop 536. The Q-output of flip-flop 550 is also connected to one input of a NOR gate 540 having its other input connected to the RFCK signal. The output (B) of NOR gate 540 is connected to the clock input of the 6-bit up-counter 534. The flip-flops 550, 536 and 538 provide delayed outputs after received serial data for one, two and three clock cycles respectively.

The 6-bit up-counter counts a number of pulses from the output (B) of the NOR gate 540 to assist in determining pulse width. The output of the 6-bit up-counter 534 is provided through connection 542 to mapper/decoder 544. The mapper/decoder 544 provides an output based upon the count received from the 6-bit up-counter 542. The mapper/decoder 544 has an RSD output representing the recovered serial data from the single wire connection (logical "1" or "0" bit), a GLH output representing a glitch signal indication over the single wire input, a BRK output indicating a break indicator received over the single wire input and an SLP output indicating a sleep indicator received over the single wire connection. Each of these outputs is connected to respective D-input of associated D flip-flops 546, 548, 550, and 552.

The mapper/decoder 544 works as follows: If the output of the 6-bit up-counter equals 1-3 the GLH output equals 1 and the other outputs equal 0. If the output of the 6-bit up-counter equals 4-11 the RSD output equals 1 and the other outputs equal 0. If the output of the 6-bit up-counter equals 12-21 the RSD output equals 0 and the other outputs equal 0. If the output of the 6-bit up-counter equals 22-63 the BRK output equals 1 and the other outputs equal 0. If the output of the 6-bit up-counter is greater than 63 the SLP output equals 1 and the other outputs equal 0. Clock inputs of each of the flip-flops 546 and 552 are connected to the Q-output of flip-flop 536. Clock inputs of flip-flops 548 and 550 are connected to the OB output of flip-flop 538. The Q-output of 536 and the QB output of flip-flop 538 are connected to the inputs of NAND gate 554. The output of NAND gate 554 represents the recovered serial clock signal (RSCK).

The recovered serial data provided from the outputs of D flip-flops 546, 548, 550 and 552 is in NRZ format, and the recovered serial clock from NAND gate 554 are output to a serial-to-parallel shift register 556 for instruction/data decoding. The shift register 556 clocks the serial data RSDI on the falling edge of the recovered clock signal RSCK. The clocked recovered serial data is output to a parallel data bus 558 for interface with the central processing unit 522. The recovered serial clock is synchronized with the recovered serial data by determining the correct phase of the provided high speed reference clock (RFCK) on the device. Thus there is provided a multi-phase digital clock recovery system that Readjusts its clock output phase after every received data bit. RSCK is also used to increment a bit counter 559 for tracking the number of bits received in the instruction/data frames.

Figure 5B:
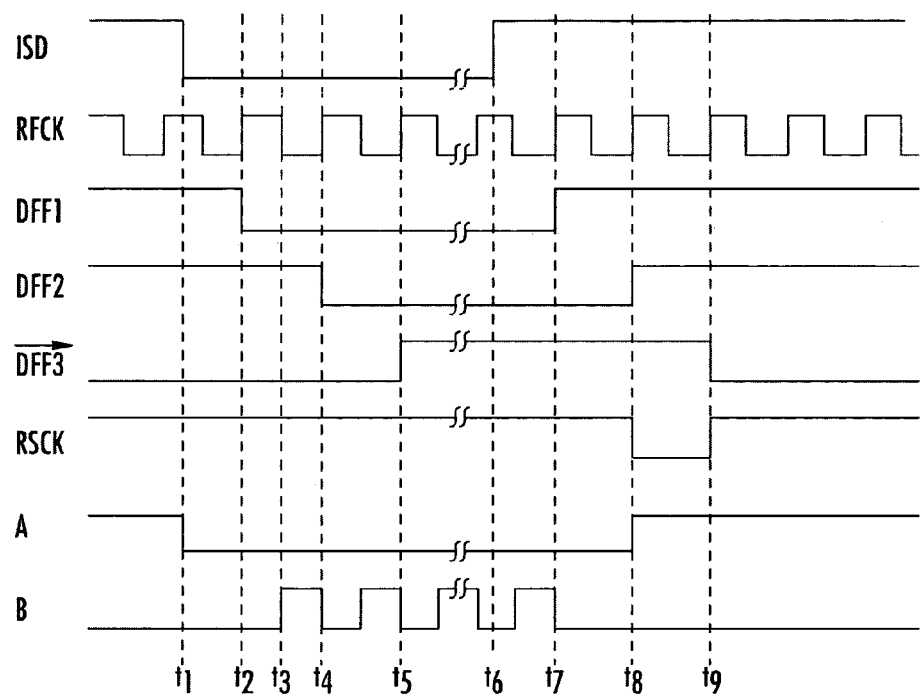
FIG. 5b is a timing diagram for the clock/data recovery circuit.

Referring now to FIG. 5b, there is illustrated a timing diagram for the clock/data recovery circuit 515 discussed with respect to FIG. 5a. Input ISD represents the received serial data that is transmitted over the single wire connection. The reference clock (RFCK) is the clock signal provided by the clock circuit 526 within the receiving device. Signal DFF1 represents the output of the D flip-flop 530. Signal DFF2 represents the output of D flip-flop 538. Signal $\overline{DFF3}$ represents the output QB of the D flip-flop 536. Signal RSCK comprises the recovered clock. Signal A represents the output of AND gate 532, and signal B represents the output of the NOR gate 540.

The received serial data ISD goes low at time $t_1$, this being the "start bit." At this point there are no other changes of the signals within the clock/signal recovery circuit 515. At time $t_2$ on the next rising clock signal after the ISD signal has gone low, the output DFF 1 of the D flip-flop 530 goes low. This is in response to the low ISD signal applied to one input of the D flip-flop 530 and the rising edge of the reference clock RFDK on the other input. At time $t_3$, the output B of the NOR gate 540 begins outputting clock pulses to be counted by the six bit up-counter 534. These clock pulses are gated to the output of the NOR gate 540 responsive to the low output of DFF 1 and the falling clock edges of the reference clock RFCK. At time $t_4$ responsive to the next rising edge of the reference clock (RFCK), the output DFF2 of the D flip-flop 536 goes low. This is responsive to the low signal applied to the input of the flip-flop 536 and the rising clock edge of signal RFCK. One clock cycle later at $t_5$ on the next rising edge of clock signal (RFCK), the QB output ($\overline{DFF3}$) of D flip-flop 538 will go high. This is in response to the low clock signal applied to the input of flip-flop 538, and the rising clock edge of RFCK.

The next event occurs at time $t_6$ wherein the input serial data signal goes from low to high, this being the "stop bit." On the next rising clock edge of the reference clock signal RFCK at $t_7$, the output of D flip-flop 530 will return high responsive to the high input from the ISD signal applied to one input and the rising edge of the clock on the other input. Time period $t_7$ also marks the end of the pulses produced on the B output of NOR gate 540. The output of D flip-flop 536 goes high at $t_8$ responsive to the high input applied at the input of D flip-flop 536 and a rising clock edge from the RFCK signal. Additionally, a low pulse is generated on the recovered signal clock output responsive to the high inputs provided to both inputs of the NAND gate 554 from the outputs of D flip-flop 536 and D flip-flop 538, respectively. Finally, at time period $t_9$, the output of D flip-flop 538 goes low responsive to the high input from D flip-flop 536 and the rising clock edge from the reference clock RFCK. In response to the output of D flip-flop 538 going low, the recovered clock signal returns high. This rising edge at $t_9$ loads data to the register 556.

Figure 5C:
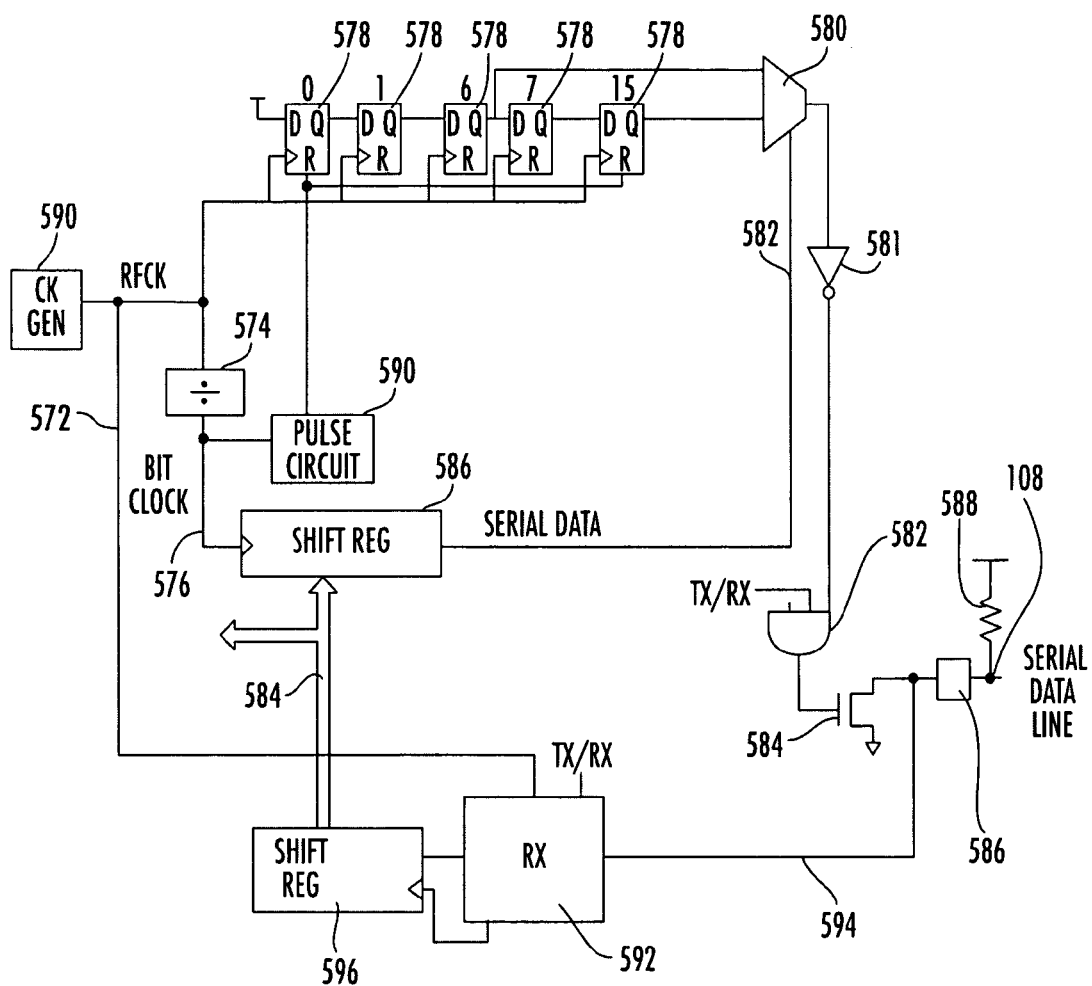
FIG. 5c is a transmitter circuit.

Referring now to FIG. 5c, there is illustrated a representative circuit diagram of the transmit portion of any of the nodes. As noted herein above, each node will be provided with the ability to transmit a byte of data to a receiving one thereof. The host device 102 is, in default mode, in a transmit mode, whereas each of the slave devices 104 and 106 are in the receive mode by default. As such, the host device 102 has control of the bus initially. However, it should be noted that the receive and transmit circuitry can be substantially identical for both circuitry or, alternatively, it could be much more complicated. For example, in a slave device, more simplified circuitry would be utilized to lower cost and size. The host functionality could, by design, be facilitated with a very high powered processor based integrated circuit or computer system.

Referring further to FIG. 5c, a transmitter for the node on the network will be described. There is provided on the node device a clock generator 570. This clock generator can be dedicated to transmitting of data and receiving of data or it can be the general timing reference on the integrated circuit associated therewith. This clock generator will generate at a time base which is typically 23* bit time such that there will be 23 pulses of the reference clock RFCK for each data bit transmitted. This is output on a node 572. This is divided down by a divider 574 to output on a node 576 of the bit clock. For the transmit operation, it is necessary to pull down the output for seven of the RFCK clock for a logic "1" and to pull it down for sixteen of the RFCK clock cycles for a logic "0." A representative circuit for this is a plurality of D-type flip-flops 578, which are arranged in series such that the Q-output thereof is connected to the D-input of the next one thereof, the D-input of the first one thereof connected to a positive voltage with the clock input thereof clocked by RFCK on node 572 and a reset input operable to reset the circuit for each bit clock cycle. The D flip-flops 578 are arranged such that the output of the seventh one thereof is connected to one input of a multiplexer 580, the other input to the multiplexer 580 connected to the Q-output of the sixteenth flip-flop 578. Therefore, after reset on the rising edge of the bit clock, all of the Q-outputs thereof will be low for one clock cycle. After seven clock cycles, the output of the seventh flip-flop 578 will go high and, after the sixteenth clock cycle, the output of the sixteenth flip-flop 578 will go high. The multiplexer 580 selects either of the two inputs based upon the logic state of the data, which is received as an enable signal on a control line 582. The output of the multiplexer 580 is connected to one input of a gate 582 through an inverter 581, the other input thereof connected to a transmit/receive control signal such that, upon transmit, the gate 582 will control the gate of an open-drain n-channel transistor 584 to pull an output terminal 586 to ground, which terminal 586 is connected to a serial data line 108. As noted herein above, there is provided a pull up resistor 588 as the passive load, such that when the gate of transistor 584 is high, terminal 586 will be pulled low and, when the gate of transistor 584 is low, the resistor 588 will pull the data line 108 high.

The data is received on a parallel data bus 584, which allows data to be input to a shift register 586 which is a parallel-to-serial shift register. This allows parallel data to be input thereto at the width of the bus 584 and shifted out by the bit clock on node 576. Thus, for each rising edge of the bit clock, the data associated with that bit will be output on the control line 582. The reset pulse is generated off the rising edge of the bit clock on node 578 with a pulse circuit 590.

The receive operation, which is part of the overall TX/RX blocks is provided by a receive block 592, which is operable to interface with the voltage level on the terminal 586 through a line 594 to allow detection of the signal thereon as described herein above, then output this to a serial-to-parallel shift register 596 which is clocked by the recovered clock for output on the data bus 584. The receive block 522 is controlled by the TX/RX signal such that, when it is in the receive mode, it will receive data and output it to the bus 584 and, when it is in the transmit mode, the receive block 592 will be inhibited from inputting data or latching data to the bus 584.

Figure 5D:
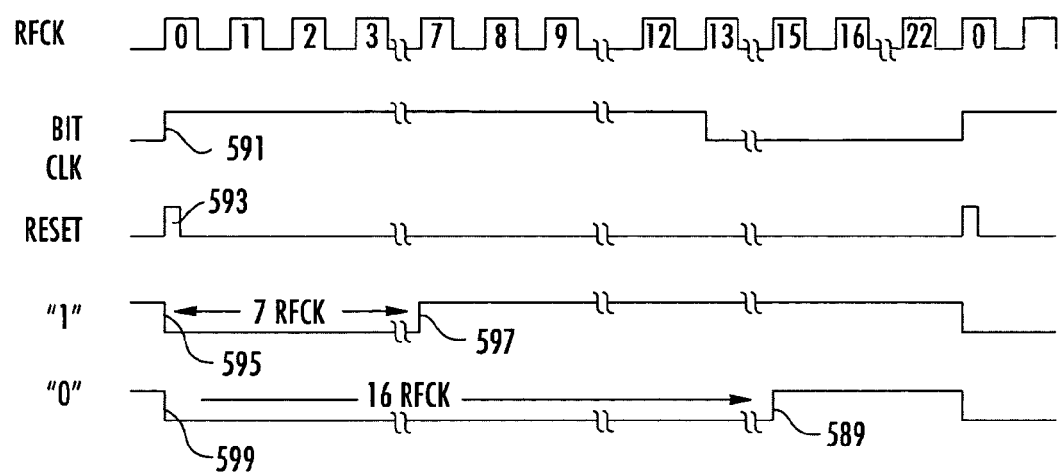
FIG. 5d is a timing diagram for the transmit operation.

Referring now to FIG. 5d, there is illustrated a timing diagram for the transmit operation. The RFCK signal, as described herein above, is related to the bit clocks such that 23 cycles thereof are required for each bit time. When the bit clock goes high at a rising edge 591, a reset pulse 593 will also be generated for resetting all of the flip-flops 578. For a "1" operation, the output will be pulled low at a falling edge 595 for seven of the RFCK clock cycles, at which time it will go high at a rising edge 597. It will remain high for the rest of the bit clock period. For a "0," the serial data line 108 will be pulled low at a falling edge 599 and will remain low for sixteen RFCK cycles until a rising edge 589 at the sixteenth one of the clock cycles from the falling edge 599. The serial data line 108 will remain high until the end of the bit clock cycle when another data bit is to be transmitted. Thus, it can be seen that the transmitted bit clock will be referenced to the rising edge 597 for the transmission of a logical "1" or to the rising edge 589 for the transmission of a logical "0" bit. At the receive side, the bit is determined at the end of the rising edge 597 and then shifted into the shift register at the receiving device with this edge 597 synchronized to the reference clock at the receiving device. Thus, the recovered receive clock will have a pulse substantially time positioned with respect to either of the rising edges 597 or 589. However, the shift register at the receiving device could have data loaded therein at the falling edge of the next data to be received. This, however, is not important, since each bit is transmitted independent of the other bits and it is not necessary to recover the bit clock for other than a single bit.

Figure 6:
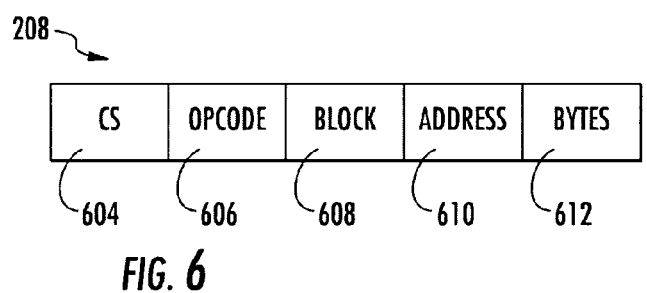
FIG. 6 is a block diagram of the access instruction transmitted from the host device to initiate communication over a single wire between a host device and a slave device.

Referring now to FIG. 6, there is illustrated the 16-bit access instruction 208 for initiating a data transfer operation between the host device 510 and slave device 512. The chip select field 604 is a 1-bit address code preprogrammed into a slave device's EEPROM memory and may be reprogrammed as necessary. If the chip select code 604 in the control access instruction 208 does not match a slave device's hard wired access code, instructions in any subsequent packets received from the host device 510 will be ignored until a break command is received. A chip select "0" bit provides for battery protection or an external battery security device. A chip select "1" bit provides an indication of a fuel gauging device. This allows for selection between two devices. The OP code field 606 is a 2-bit field provides an indication of the operation to be performed. These fields are directed toward the functionality embedded within the slave device.

The "01" OP code indicates a normal Read operation providing that data should be read from the slave device 512 into the host device 510, i.e., transmitted from the slave to the host. The "10" OP code indicates a Read operation with CRC providing for a Read from the slave register, but includes a one byte CRC appended to the end of the last Read packet from the slave device 510. The "00" OP code indicates a Write operation and provides that data should be written to the slave device 512 from the host device 510, this being a receive operation at the slave. The "11" OP code indicates a first capture trigger that provides a trigger of a voltage A/D measurement and a Read operation from the indicated device register once the triggered conversion is completed. To disable the auto read-back function, the field 608 may be set to "10".

Figure 6A:
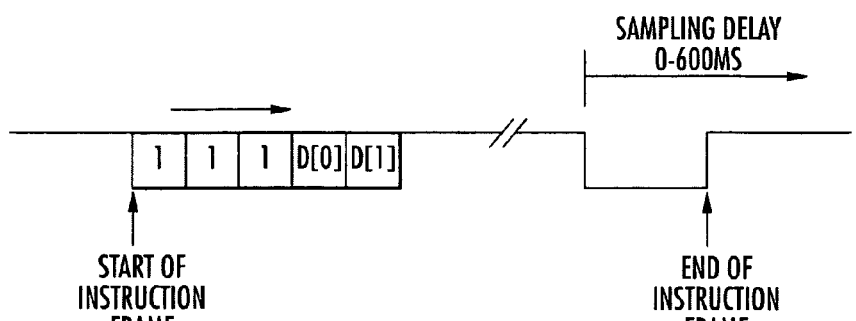

When the special purpose OP code "11" is detected, the format of the instruction frame containing the OP code is redefined as illustrated in FIG. 6a. D[0] and D[1] are the sampling delay fields which are defined such that "00" indicates no sampling delay, "01" indicates a 200 microsecond sampling delay, "10" indicates a 400 microsecond sampling delay and "11" indicates a 600 microsecond sampling delay.

The block field 608 is a two bit field indicating where the provided data is to be written. A block code "00" indicates that the data should be written to the EEPROM memory. A "01" block code indicates that data should be written to control, status and data registers. A "10" block code indicates that data should be written to the device authentication registers, and a "11" block code indicates that data should be written to the test registers. Writing to the EEPROM memory may only occur one byte at a time. Device authentication registers can be locked out. Once the device authentication registers are locked, no Read/Write access to this register is possible. Furthermore, once the device authentication registers are locked, they cannot be unlocked.

The address field 610 is an 8 bit long field indicating the starting address of a register Read or Write sequence.

The bytes field 612 indicates the number of data bytes to be read or written during the Read or Write operation. The number of bytes does not include the CRC byte, if any. The bytes field 612 is three bits long. Thus, a total of 16 bytes may be indicated in the three bit field. If the byte field 612 reads "0 h" (hexadecimal) this indicates that zero bytes will be following and is used for instructions which do not require data. If the byte field 612 reads "1 h" (hexadecimal) this indicates one byte of data will be following. When the byte field reads "2 h" (hexadecimal) this indicates that two bytes of data will be following and is used for Read operations from or Write operations to multi-byte result registers. When the byte field Reads "3 h" (hexadecimal) this indicates that three bytes of data will be following and is used such that wide registers will be strobed simultaneously. An indication in the byte field 612 of "4 h" (hexadecimal) indicates four bytes of data will be following and is used for multi-byte serial Read or Write processes. If the byte field reads either "5 h" (hexadecimal) or "6 h" (hexadecimal) this is an invalid selection and causes the device to output a break command. A byte field 612 indication of "7 h" (hexadecimal) indicates that 16 bytes of data will be following and is used only for reading from or writing to the EEPROM memory.

Figure 7A:
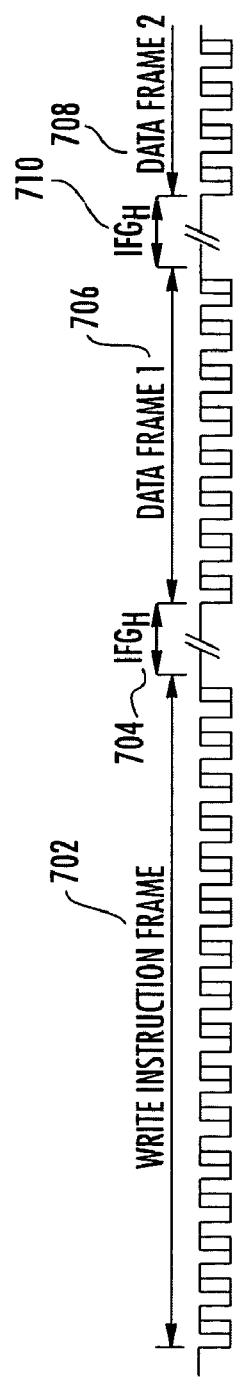
FIGS. 7a-7c illustrate the bus transaction protocol for multibyte Read and Write operations and back-to-back transactions.
Figure 7B:
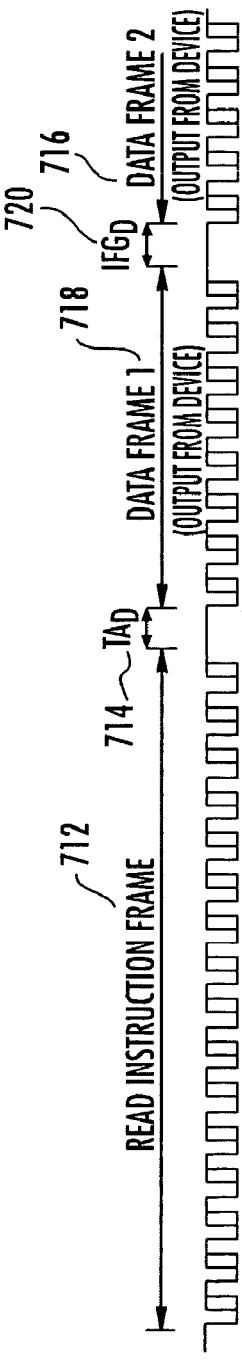
Figure 7C:
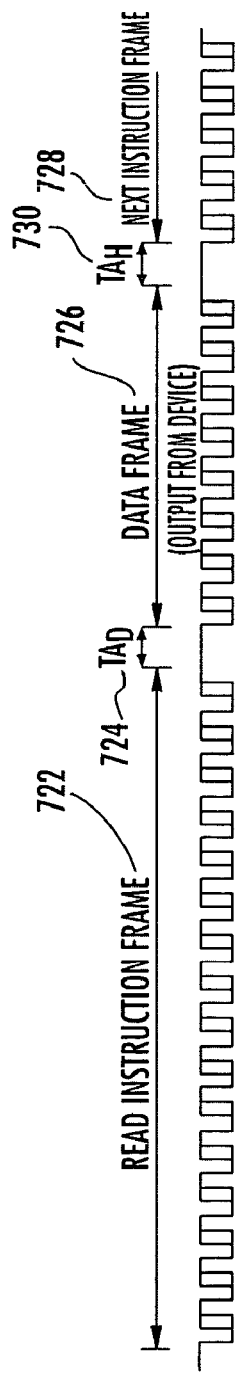

Referring now to FIGS. 7a-7c, there is illustrated the bus transaction protocol for multi-byte Write operations, multi-byte Read operations, and back-to-back transactions (wherein a Read is followed by a Write.) In the multi-byte Write transaction illustrated in FIG. 7a, the Write frame instruction 702 is followed by the host inner frame gap ($IFG_H$) 704 which is followed by first and second data frames 706 and 708, also separated by a host inner frame gap 710.

The multi-byte Read operation illustrated in FIG. 7b illustrates the Read instruction frame 712 separated by the device turnaround time ($TA_D$) 714 from a first data frame 718, which is separated from the second data frame 716 by the device inner frame gap ($IFG_D$) 720.

The Read operation followed by a Write operation illustrated in FIG. 7c, illustrates the Read frame operation 722 separated by the device turnaround time ($TA_D$) 724 from the data frame 726. The data frame 726 is separated from the next instruction frame 728 by the host turnaround time ($TA_A$) 730. The next instruction frame 728 would comprise the Write operation.

Figure 8:
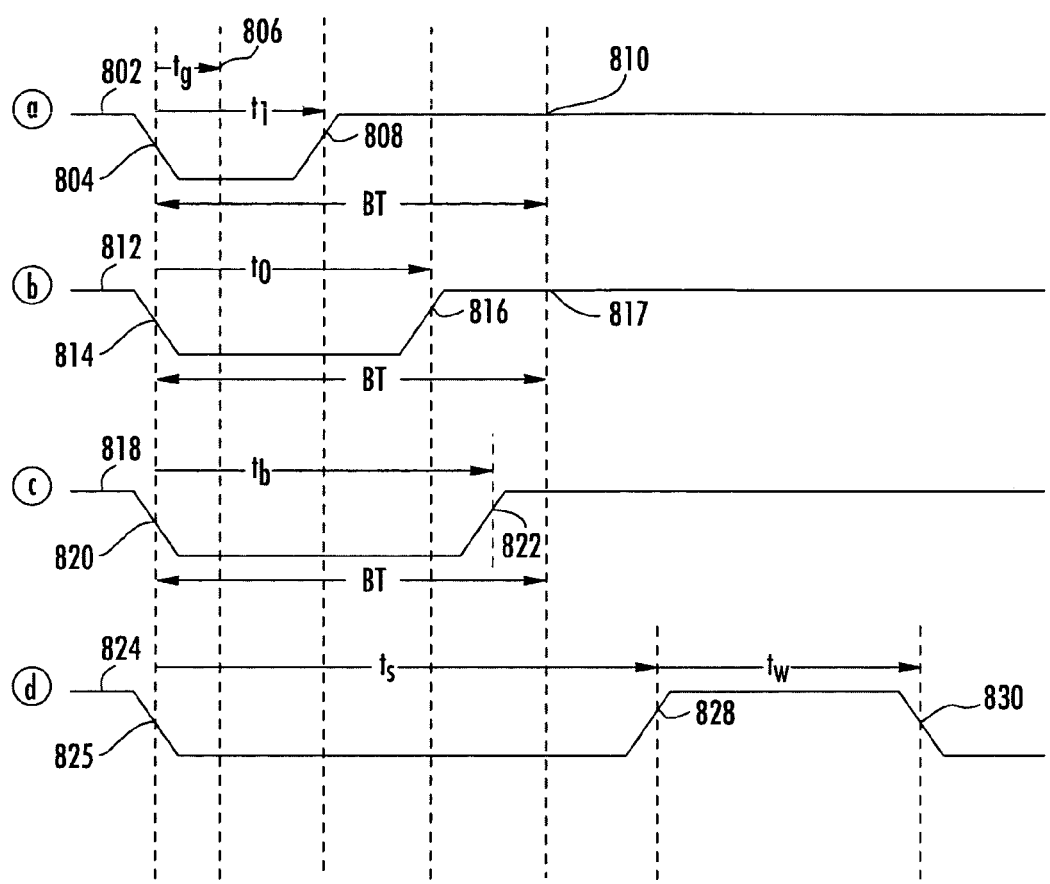
FIGS. 8a-8d are timing diagrams illustrating the manner in which logical data may be transmitted between a host device and a slave device utilizing predetermined pulse widths.

Referring now also to FIG. 8a-8d, there are illustrated the manner in which various logical data may be transmitted between the host device 510 and the slave device 512. FIG. 8a illustrates the manner in which a logical "1" may be transmitted. The voltage level on line 514 is initially held high at 802 by the passive load as described previously. At falling edge 804, the voltage level is pulled low indicating the start of a data transfer operation, i.e., a "start bit." The voltage signal on line 514 will remain low for a predetermined period of time depending on whether a "1" bit or a "0" bit of information is being transferred. As shown in FIG. 8a, the signal must be held low for at least a period of time (tg) beginning at falling edge 804 and passing to a point 806 for any logic state of data. A pulse width less than tg will result in a packet error. The time periods given below include the variable x, wherein x comprises a selectable bus speed of 2.89 KHz (x=0.5), 5.78 KHz (X=1), 11.56 KHz (x=2), and 23.12 KHz (x=4). In the preferred embodiment, the length of tg is 22/x microseconds. When the voltage signal is driven back high at rising edge 808 within a time period denoted by t1 this indicates the transmission of a logical "1" bit, noting that the positive transition 808 indicates the "stop bit" or termination of data transmission for that single bit. In the preferred embodiment, the point at which the voltage signal may be driven high to indicate a logical "1" can fall within a range of 53.9/x-73.2/x microseconds for the host device and 51.3/x-53.9/x microseconds for the slave device. Finally, it is noted that FIG. 8a illustrates the width of the bit period designated BT for "bit time." The bit period runs from the falling pulse edge 804 to point 810. In the preferred embodiment this bit period is approximately 172.8/x microseconds. This is the time period during which the pulse indicating the "1" bit or "0" bit must be transmitted.

Referring now to FIG. 8b, there is illustrated the transmission of a logical "0" bit according to the method of the present disclosure. Initially, the voltage level on line 514 is held high at 812. The signal is driven low at falling edge 814 by the device transmitting data. The voltage level is held low until a rising edge 816. The time period between falling edge 814 and rising edge 816 indicates a logical "0" pulse width t0. In one embodiment, the logical "0" pulse width must be held between 107.8/x-131.8/x microseconds for the host device and 117.2/x-123.2/x microseconds for the slave device. Thus, the rising clock edge 816 of the logical "0" pulse is somewhere within this range. As with respect to FIG. 8a, the bit period BT is the time in which the entire pulse representing the "0" logical data bit must be transmitted and lies between the falling clock edge 814 and point 817.

Referring now to FIG. 8c, there is illustrated additional data which may be transmitted within the pulse widths over line 514 in addition to the logical "0" and logical "1" discussed with respect to FIGS. 8a and 8b. A break command may be indicated to the receiving unit by providing a pulse width that exceeds that of both the logical "1" bit and logical "0" bit. As shown in FIG. 8c, the voltage level on output line 514 is initially held high at point 818. From a falling clock edge 820, the break time (tb) holds the pulse width low until a rising clock edge 822. In the disclosed embodiment, the rising clock edge 822 for the break command may be provided anywhere in a range from 0.17/x-1 milliseconds for the host device and 181.3/x-192.5/x microseconds for the slave device. The break code is an indication provided by the slave device 112 indicating that it is unable to perform an instruction provided by the host due to a bus error or EEPROM access during a EEPROM Write operation.

Referring now to FIG. 8d, there is illustrated the manner in which the slave or host devices may be placed in a shelf sleep mode. In this case, the voltage level is initially held high at a point 824 and then actively driven low at falling edge 825. The pulse remains at a low voltage level until released and passively pulled high at rising edge 828. The sleep time pulse width (ts) in the disclosed embodiment is at least 200 milliseconds long. This places the receiving device in the shelf sleep mode. Once the device is in the shelf sleep mode, a wake time pulse having a width (tw) may be provided by maintaining the voltage level on line 514 at a high level for a sufficient period of time between rising edge 828 and a falling edge 830. In the preferred embodiment, the wake time pulse width (tw) will be at least one millisecond.

Figure 9:
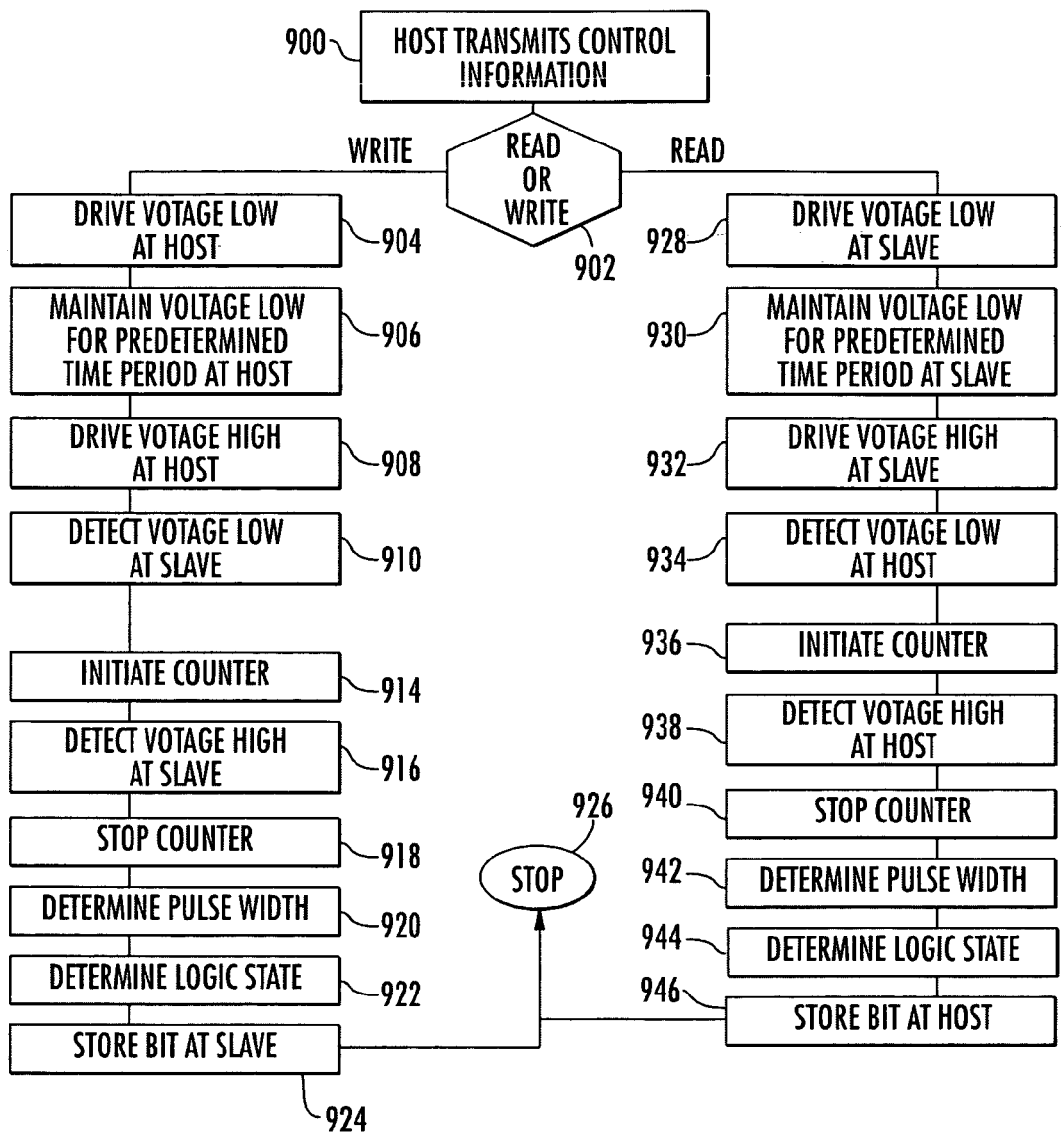
FIG. 9 is a flow diagram illustrating a data transfer operation between a host device and a slave device according to the method of the present disclosure.

Referring now to FIG. 9, there is illustrated a flow diagram describing the operation of the pseudo-synchronous single wire bidirectional interface of the present disclosure. Initially, at step 900 the host device 510 transmits the 16-bit instruction packet to the slave device 512 containing all control information for the present operation. Inquiry step 902 determines whether the control information indicates that the operation is a Write operation or Read operation. If the control information illustrates a Write operation is to be performed, the host drives, at step 904, the voltage level low on line 514. This provides an indication of the start of the transmission of a logical "1" or "0" data bit. The voltage level is maintained at a low level at step 906 for a predetermined period of time by the host based upon whether a logical "0" or logical "1" is being transmitted. When the predetermined time period associated with the logical "0" or logical "1" has expired, the host drives the voltage level high at step 908, indicating the completion of bit transmission. The pulse generated at the host is transmitted along the single line 514 until it reaches the slave device 512.

The slave device 512 detects the voltage low level indicating the beginning of a transmission pulse at step 910. In response to the detection of the falling pulse edge at step 410, the slave device 512 initiates, at step 914, a counter to assist in measuring the width of the pulse which is about to be received. The slave device 512 next detects at step 916 the voltage level going high on line 514. In response to the rising pulse edge on line 514, the slave device 512 will stop, at step 918, the counter initiated at step 914.

Using the information stored within the counter, the CPU 522 within the slave device 512 determines at step 920 the width of the pulse transmitted from the host device 510. The determined pulse width is used at step 922 to determine whether a logical "1" or "0" bit was transmitted. The determined bit is stored at the slave device at step 924 in a register for later storage at the location indicated by the block field 306 and address field 308 of the instruction packet 300, when the entire byte is received. The process ends at step 926.

If inquiry step 902 determines that a Read operation is to be performed by the host device 510, the slave device 512 then controls the data transmission operation and drives the voltage level on line 514 low at step 928. The slave device 512 maintains, at step 930, the voltage level low for a predetermined period of time associated with whether a logical "1" or "0" bit is being transmitted from the slave device 512 to the host device 510. Once the predetermined period has expired, the slave device 512 will drive the voltage level high at step 932 indicating the end of the transmitted logical data bit.

In response to the falling clock edge, the host device 5 10 will initiate a counter at step 936 to assist in measuring the width of the pulse about to be received, this counter synchronized to the host clock and not the slave clock. At step 938, the host device 510 will detect the voltage level on line 514 going high. In response to the rising edge of the pulse, the host 510 will stop the counter at step 940. The CPU 522 within the host device 110 utilizes the information within the counter to determine at step 942 the width of the pulse. Using the width of the pulse, a logical "1" or logical "0" state is then determined at step 944. The logical bit determined at step 944 is stored at the host device 510 at step 946 in a register for later storage in the location indicated by the block and address fields (306, 308) provided within the instruction packet 300, when the entire byte is received. The process ends at step 926.

Figure 10:
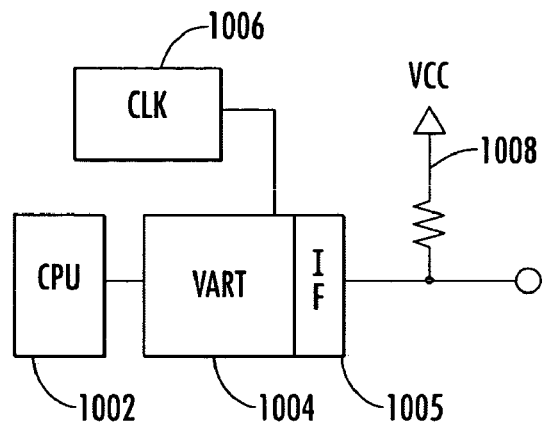
FIG. 10 is a block diagram of a UART circuit configured to operate using the single wire bus interface of the present disclosure.

Referring now to FIG. 10, there is illustrated an implementation of the pseudo-synchronous single wire communications protocol of the present disclosure using a UART 1004. The UART 1004 is interconnected with a CPU 1002 via a conventional UART interface. The other side of the UART 1004 includes an interface 1005 operating according to the single wire communications system described herein above. The UART acts as a translator between the conventional UART protocol and the single wire protocol of the present system. The interface 1005 within the UART has an open drain output with the external pull-up resistor 1008. A clock 1006 providing a stable clock is also connected to the UART 1004. The external pull-up resistor 1008 is scaled for the provided bus rate and load capacitance in accordance with the following chart.

| Single Wire Bus Rate | UART Baud Rate | Reference Clock (MHz) | UART Divisor Setting | Pull-up Resistor (kΩ @ 10 pF) |
|---|---|---|---|---|
| x = 0 . . . 5 | 28.8k | 1.8432 | 4 | 1000 |
| x = 1 | 57.6k | 1.8432 | 2 | 500 |
| x = 2 | 115.2k | 1.8432 | 1 | 250 |
| x = 4 | 230.4k | 3.6864 | 1 | 125 |

When UART 1004 transmits a logical "1, " the interface 1005 will output the 8-bit sequence "00111111. " When the UART 1004 outputs a logical "0, " the interface 1005 will output the 8-bit sequence "00000011. " The UART 1004 recognizes a received logical "1" bit when receiving one of four 8-bit combinations through the interface 1005. These 8-bit combinations include "01111111," "00111111," "00011111, " and "00001111. " Likewise, the receipt of a logical "0" bit is indicated by the receipt of four 8-bit sequences. The receive bit sequences for a logical "0" include "00000111," "00000011," "00000001, " and "00000000. " Any other received combination of a 8-bits provides an indication of a receive error.

Figure 11:
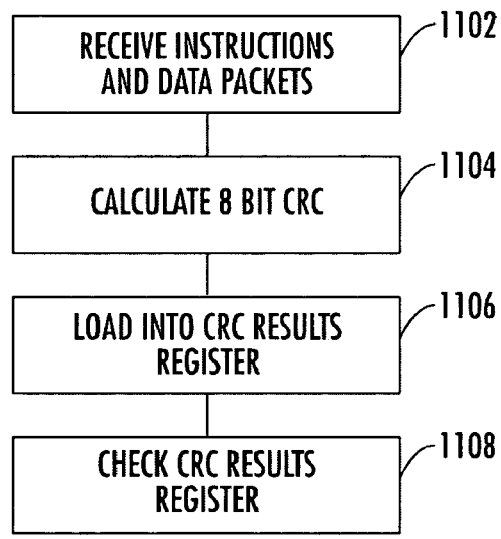
FIG. 11 is a flow diagram describing a passive CRC process for including CRC with Write data.
Figure 12:
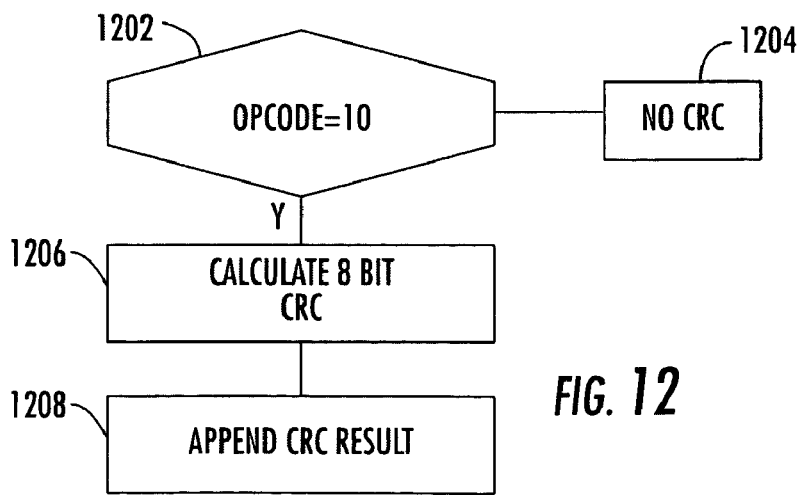
FIG. 12 is a flow diagram illustrating a passive CRC process for Read data.

Referring now to FIGS. 11 and 12, there are illustrated the manner in which a passive cyclic redundancy check (CRC) may be performed on data transmitted over the single pseudo-synchronous single wire communications bus of the present disclosure. FIG. 11 illustrates the use of CRC with respect to Write data. The slave device 512 will first receive the instruction and data packets at step 1102. From the instructions and data packets, the slave device 512 will calculate an 8-bit CRC at step 1104. The resulting CRC results are loaded into the CRC result register at step 1106. The host device 510 examines, at step 1108, the CRC results within the CRC result register to determine if rewriting to the slave device 512 is necessary.

Referring specifically to FIG. 12, there is illustrated the CRC operation with respect to Read data. When inquiry step 1202 determines that the OP code from the instruction command equals "10," an 8-bit CRC is automatically calculated, at step 1206, for the data bytes being transferred out of the slave device 512. The CRC result is appended, at step 1208, to the last data byte being transferred out of the slave device 512. If no OP code is determined by inquiry step 1202, no CRC bits are appended at step 1204.

Figure 13:
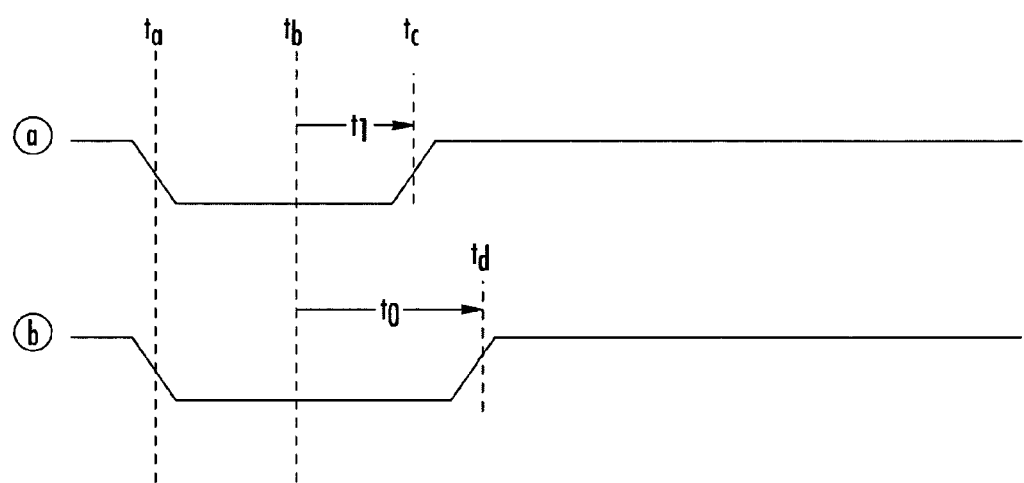
FIG. 13 is a timing diagram illustrating an alternative embodiment for transmitting logical data utilizing pulse width according to the present disclosure.

Referring now to FIG. 13, there is illustrated an alternative manner for utilizing the pulse length to determine the transmission of a logical "1" or logical "0" over the single wire connection between the host device 510 and the slave device 512 during a Read operation. In signal A, the host device 510 drives the signal on the single wire low at point $t_a$. The host maintains the line low for a select period of time until point $t_b$. At point $t_b$, the host device 510 releases control of the signal on the single wire connection to enable it to go back high. Since this is a Read operation, the slave device 512 begins maintaining the line low at some point before or beginning at time $t_b$. If the slave device maintains the signal low upon the single wire connection for a time $t_1$ until point $t_c$, this provides an indication of the transmission of a logical "1" bit. If the slave device 512 maintains the line low for a period $t_0$ from point $t_b$ to point $t_d$ this provides an indication of the transmission of a logical "0" bit. Thus, in order to determine the transmission of the logical "1" or logical "0" bit, the pulse length must only be measured from point $t_b$ to point $t_c$ or point $t_d$ rather than beginning at point $t_a$. This would provide some notice of measurement of the clock pulse, since the driving down of the signal on the transmission line at point $t_a$ would provide notice of measurements of the pulse widths beginning at point $t_b$ for the Read operation.

Although the preferred embodiment has been described in detail, it should be understood that various changes, substitutions and alterations can be made therein without departing from the spirit and scope of the invention as defined by the appended claims.

What is claimed is:

1. A method for transferring data between a transmitter and a receiver over a single conductor, comprising the steps of:
maintaining the conductor at a first voltage level when data is not being transmitted from the transmitter to the receiver;

during a data transfer operation of a bit of information:
driving the voltage on the conductor from the first voltage level to a second voltage level to define a first pulse edge of an input signal;
maintaining the voltage on the conductor at substantially the second voltage level for a predetermined duration of time, which predetermined duration of time has a length that is determined by the logic state of the data bit;
at the end of the predetermined duration of time, allowing the voltage level on the conductor to return to substantially the first voltage level to define a second pulse edge of the input signal;
recovering a serial clock signal for each received bit of information responsive to a logic operation of a delayed input signal and an inverted delay of the delayed input signal; and
outputting the received data bit responsive to the recovered clock signal associated with the received data bit.

2. The method of claim 1, wherein the data bit has two logic states, a first logic state and a second logic state.

3. The method of claim 2, wherein the predetermined duration of time has a first duration associated with the first logic state and a second duration associated with the second logic state.

4. The method of claim 3, wherein the first duration of time has a minimum value and a maximum value and wherein the first logic state is valid only after the minimum value of the first duration of time.

5. The method of claim 4, wherein the second duration has a minimum value that is equal to or greater than the maximum value of the first duration of time, and a maximum value, and wherein the second logic state is valid only after the minimum value of the second duration of time.

6. The method of claim 1, wherein the step of maintaining the conductor at a first voltage level when data is not being transmitted from the transmitter to the receiver comprises the step of weakly pulling the conductor to the first voltage level.

7. The method of claim 6, wherein the step of weakly pulling the conductor to the first voltage level comprises disposing a passive load between a voltage source disposed at the first voltage level and the conductor.

8. The method of claim 7, wherein the step maintaining the voltage on the conductor at substantially the second voltage level for a predetermined duration of time comprises driving the conductor with an active device disposed between the conductor and a voltage source disposed at the second voltage level.

9. A method for receiving at a receiver data transmitted from a transmitter over a single conductor to the receiver, comprising the steps of:
detecting a first transition of the voltage level on the conductor from a first voltage level to a second voltage level indicating the initiation of the operation of a data transfer operation of a bit of information from the transmitter to the receiver of an input signal;
detecting a second transition of the voltage level on the conductor from the second voltage level to the first voltage level indicating the end of the operation of the data transfer operation of a bit of information from the transmitter of the input signal;
determining the duration of time between the first and second data transitions;
wherein the data bit transferred has a plurality of logic states, each associated with a different value of the duration of time between the first and second transitions;
determining from the length of the determined duration of time the logic state of transmitted data bit;
recovering a serial data clock signal for each of the transferred data bits responsive to a logic operation of a delayed input signal and an inverted delay of the delayed input signal; and
outputting the transferred data bit at the determined logic state responsive to the recovered serial data clock signal associated with the transferred data bit.

10. The method of claim 9, wherein the data bit has two logic states, a first logic state and a second logic state.

11. The method of claim 10, wherein the duration of time between the first and second transitions has a first duration of time associated with the first logic state and a second duration of time associated with the second logic state.

12. The method of claim 11, wherein the first duration of time has a minimum value and a maximum value and wherein the step of determining the logic state of the transmitted data bit determines that the logic state of the transmitted data corresponds to the first logic state if the second transition occurs at or after the minimum value and at or before the maximum of the first duration of time.

13. The method of claim 12, wherein the second duration has a minimum value that is equal to or greater than the maximum value of the first duration of time, and a maximum value, and wherein the step of determining the logic state of the transmitted data determines that the logic state of the transmitted data corresponds to the second logic state if the second transition occurs at or after the minimum value and at or before the maximum value of the second duration of time.

14. The method of claim 10, wherein the duration of time between the first and second transitions comprises a pulse width, and the first logic state corresponds to a pulse width of a first width and the second logic state corresponds to a pulse width of a second width greater than the first pulse width.

15. The method of claim 14, wherein the first width has a minimum value and a maximum value and wherein the step of determining determines that the logic state of the transmitted data corresponds to the first logic state if the second transition occurs at or after the minimum value and at or before the maximum value of the first pulse width.

16. The method of claim 15, wherein the second pulse width has a minimum value that is equal to or greater than the maximum value of the first pulse width and a maximum value, and wherein the step of determining determines that the logic state corresponds to the second logic state if the second transition occurs at or after the minimum value and at or before the maximum value of the second pulse width.

17. The method of claim 9, wherein the step of determining the duration of time comprises the steps of:
providing a clock circuit for generating a receive clock:
providing a counter that is operable to count cycles of the receive clock;
initiating a count operation by the counter upon occurrence of the first transition;
terminating the operation of the count operation upon the occurrence of the second transition, the count value determined thereby utilized by the step of determining the logic state.

18. A method for transmitting data over a single wire conductor between a host system and a slave system, comprising the steps of:
transmitting control information from the host to the slave to determine the direction of data transfer;
for the step of transferring a bit of information, the one of the host or slave systems transferring the bit of information by the steps of:

driving the voltage on the conductor from the first voltage level to a second voltage level;

maintaining the voltage on the conductor at substantially the second voltage level for a predetermined duration of time, which predetermined duration of time has a length that is determined by the logic state of the data bit;

at the end of the predetermined duration of time, driving the voltage level on the conductor to substantially the first voltage level;

for the step of receiving data at the receiving one of the host or slave systems, receiving the data by the steps of:

detecting a first transition of the voltage level of an input signal on the conductor from the first voltage level to the second voltage level indicating the initiation of the operation of a data transfer operation of a bit of information from the transmitter from the transmitting one of the host or slave systems to the receiving one of the host or slave systems;

detecting a second transition of the voltage level of the input signal on the conductor from the second voltage level to the first voltage level indicating the end of the operation of the data transfer operation of a bit of information from the transmitting one of the host or slave systems;

determining the duration of time between the first and second data transitions;

determining from the length of the determined duration of time the logic state of the transmitted data bit;

recovering a serial data clock signal for each of the transferred data bits responsive to a logic operation of a delayed input signal and an inverted delay of the delayed input signal; and outputting the transferred data bit at the determined logic state responsive to the recovered serial data clock signal associated with the transferred data bit.

19. The method of claim 18, wherein the data bit has two logic states, a first logic state and a second logic state.

20. The method of claim 19, wherein the predetermined duration of time has a first duration associated with the first logic state and a second duration associated with the second logic state.

21. The method of claim 20, wherein the first duration of time has a minimum value and a maximum value and wherein the first logic state is valid only after the minimum value of the first duration of time.

22. The method of claim 21, wherein the second duration has a minimum value that is equal to or greater than the maximum value of the first duration of time, and a maximum value, and wherein the second logic state is valid only after the minimum value of the second duration of time.

23. The method of claim 22, wherein the first duration of time has a minimum value and a maximum value and wherein the step of determining the logic state of the transmitted data bit determines that the logic state of the transmitted data corresponds to the first logic state if the second transition occurs at or after the minimum value and at or before the maximum of the first duration of time.

24. The method of claim 23, wherein the second duration has a minimum value that is equal to or greater than the maximum value of the first duration of time, and a maximum value, and wherein the step of determining the logic state of the transmitted data determines that the logic state of the transmitted data corresponds to the second logic state if the second transition occurs at or after the minimum value and at or before the maximum value of the second duration of time.

25. The method of claim 24, wherein the duration of time between the first and second transitions comprises a pulse width, and the first logic state corresponds to a pulse width of a first width and the second logic state corresponds to a pulse width of a second width greater than the first pulse width.

26. The method of claim 25, wherein the first width has a minimum value and a maximum value and wherein the step of determining determines that the logic state of the transmitted data corresponds to the first logic state if the second transition occurs at or after the minimum value and at or before the maximum value of the first pulse width.

27. The method of claim 26, wherein the second pulse width has a minimum value that is equal to or greater than the maximum value of the first pulse width and a maximum value, and wherein the step of determining determines that the logic state corresponds to the second logic state if the second transition occurs at or after the minimum value and at or before the maximum value of the second pulse width.

28. The method of claim 18, wherein the step of maintaining the conductor at a first voltage level when data is not being transmitted from the transmitting one of the host or slave systems to the receiving one thereof comprises the step of weakly pulling the conductor to the first voltage level.

29. The method of claim 28, wherein the step of weakly pulling the conductor to the first voltage level comprises disposing a passive load between a voltage source disposed at the first voltage level and the conductor.

30. The method of claim 29, wherein the step maintaining the voltage on the conductor at substantially the second voltage for a predetermined duration of time comprises driving the conductor with an active device disposed between the conductor and a voltage source disposed at the second voltage level.

31. The method of claim 18, wherein the step of determining the duration of time between the first and second transitions comprises the steps of:

providing a clock circuit for generating a receive clock:

providing a counter that is operable to count cycles of the receive clock;

initiating a count operation by the counter upon occurrence of the first transition;

terminating the operation of the count operation upon the occurrence of the second transition, the count value determined thereby utilized by the step of determining the logic state.

* * * * *